United States Patent [19]
Gramlich et al.

[11] 3,868,766
[45] Mar. 4, 1975

[54] METHOD OF FORMING AN INSULATED COIL FOR A DYNAMOELECTRIC MACHINE

[75] Inventors: Donald L. Gramlich, Belleville; Ormond J. Jedele, Pinckney; Robert M. Pearson, Plymouth, all of Mich.

[73] Assignee: Ford Motor Company, Dearborn, Mich.

[22] Filed: Aug. 31, 1973

[21] Appl. No.: 393,700

[52] U.S. Cl. .............. 29/596, 29/605, 310/194, 310/208, 336/209
[51] Int. Cl. .............................................. H01f 7/06
[58] Field of Search ...... 29/596, 605; 310/180, 194, 310/208, 42; 336/206, 207, 209, 229

[56] References Cited
UNITED STATES PATENTS

| | | | |
|---|---|---|---|
| 755,537 | 3/1904 | Porsche et al. | 29/605 |
| 1,118,446 | 11/1914 | Roos | 336/206 |
| 1,797,768 | 3/1931 | Goad | 310/180 |
| 3,549,926 | 12/1970 | Pentland | 336/206 |

*Primary Examiner*—Carl E. Hall
*Attorney, Agent, or Firm*—Robert A. Benziger; Keith L. Zerschling

[57] ABSTRACT

A field coil, particularly for use in a dynamoelectric machine such as an internal combustion engine starter motor, is provided with insulation in the form of a first insulating member which comprises a strip of insulating paper interposed between adjacent turns of the conductor of the field coil. Insulation external of the coil structure is provided by a second insulating member in the form of at least one sheet of paper folded, bonded to itself and perforated in a toroidal form. The toroid is perforated or otherwise cut to expose the ends of the conductor for communication to a source of electrical energy.

7 Claims, 9 Drawing Figures

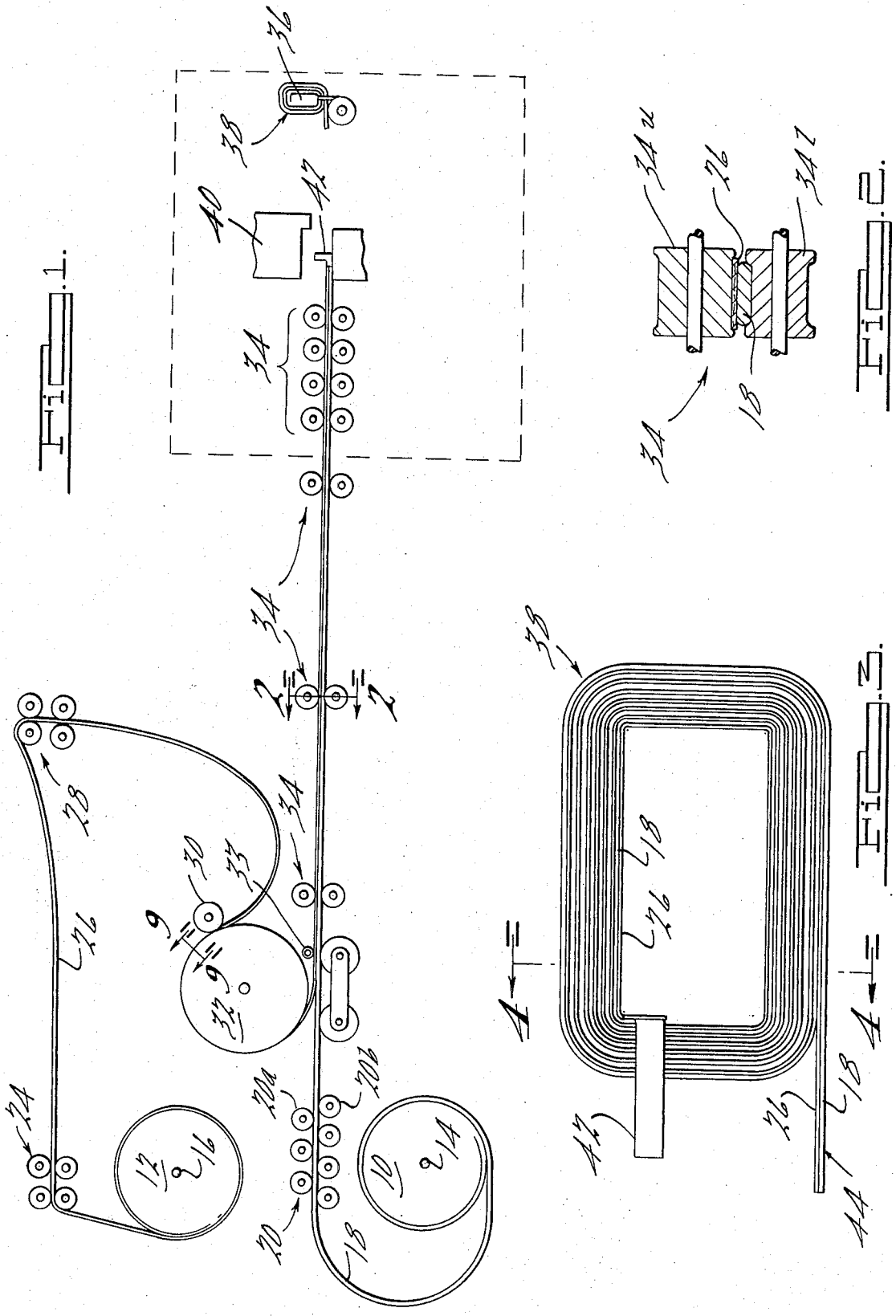

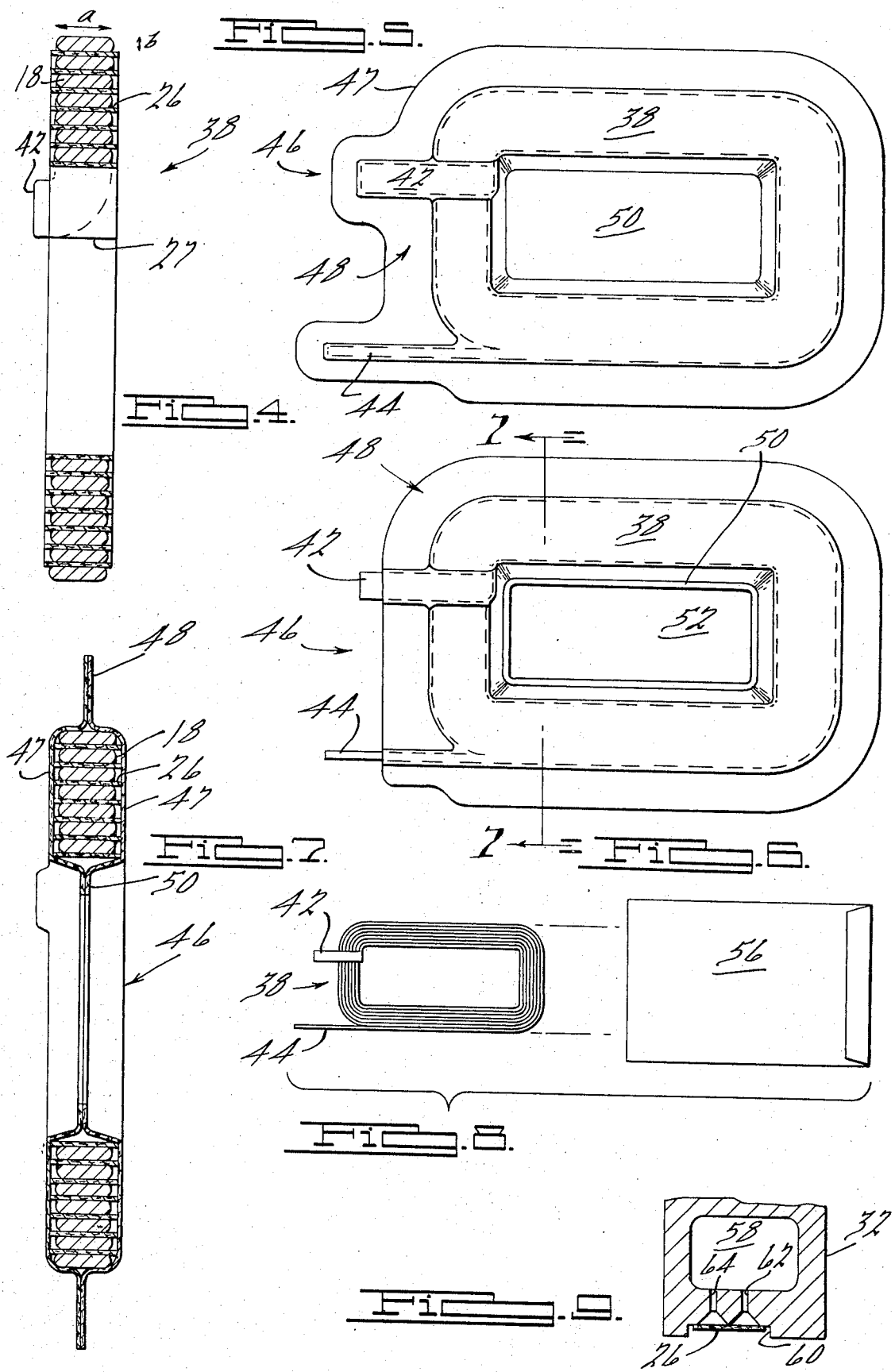

METHOD OF FORMING AN INSULATED COIL FOR A DYNAMOELECTRIC MACHINE

BACKGROUND OF THE INVENTION

1. Field of the Invention

The present invention is related to the field of insulated coil structures, usable for example in dynamoelectric machines, and more particularly to that portion of the above noted field which is concerned with the method of forming the insulation for these field coil structures.

2. Description of the Prior Art

The prior art teaches that the insulated field coil structures used as the stator field producing means of a dynamoelectric machine are to be formed having a large current carrying capability. Such coils as may be used in, for example, starter motors for internal combustion engines are typically provided with a copper conductor having a rectangular cross section the major dimension of which is several multiples of the minor dimension. The conductor is then coiled into a roughly rectangular form. Such coils must of course be adequately insulated to avoid shorting out of the current between adjacent turns of the coil or to the enclosing housing and/or the pole structure.

The prior art teaches that adequate insulation may be provided by applying a relatively thin coating of insulating lacquer material, which incidentally, inhibits corrosion of the copper, and by a suitable wrapping of dielectric material such as paper. The presently preferred form of this paper is a relatively heavy thickness of crepe paper. The prior art teaches that this paper insulation may be provided in a variety of ways. One of these ways is to provide an overlapping helical wrapping of this paper around the generally linear conductor prior to formation of the field coil shape. Another way of providing this insulation has been to provide an individual layer of insulating paper between the turns of the flat wire or conductor and to then provide a wrapping of paper or cloth tape in an overlapping helical fashion a around the coiled conductor. As an additional form of insulation, this structure may then be dipped in a plastic material which may be subsequently cured by heat treating. Still another method of forming the insulated coil is disclosed and described in the U.S. Pat. No. 3,549,926 issued in the name of Alex M. Pentland titled "Insulated Coil for Use in a Dynamoelectric Machine" and assigned to the assignee hereof wherein the linear conductor is completely enclosed by a linear wrapping of insulating paper prior to the process of forming the coil. Still another method of providing the insulation for the coil has been to provide a generally toroidally-shaped conductor coil with flat paper insulation interposed between adjacent turns of the conductor. The toroidal shape is then enclosed in preformed paper, fabric or cardboard housing structure which is comprised of a large number of individual sections, each of which is generally relatively complex in nature.

The above enumerated methods of providing the insulation of a stator field coil generally accomplish a satisfactory result within the framework of the use intended for the stator coil so insulated. However, in the fabrication of a stator field coil, particularly for use in a starter motor of an internal combustion engine, it is highly desirable to achieve a maximum amount of copper conductor within the available space so as to maximize the electric field so generated and hence the amount of torque available from the motor. Furthermore, such field coils are normally situated between a pole piece and the housing structure such as illustrated in FIG. 7 of the above-noted Pentland patent. Since this structure requires the lateral displacement of adjacent turns of the coil structure to fit a curved space, and such coils are normally fabricated by automated techniques which produce a coil structure having no initial lateral displacement, (and in fact handling of the individual coil structure is facilitated by such structures having no initial lateral displacement) these coil structures must be relatively flexible so as to be deformable to provide the desired lateral displacement in use. Furthermore, the amount of force generated in laterally displacing the turns of the coil with respect to each other requires that the insulation be capable of withstanding an amount of stretching and rubbing while maintaining its integrity. It is therefore an object of the present invention to provide a method of forming a stator field coil which maximizes the amount of copper which may be contained within a given volume by reducing to a requisite minimum the amount of insulation interposed between adjacent turns of the coil structure and which method results in a readily laterally displaceable coil structure which may be fabricated by automated fabrication techniques. More particularly, it is an object of the present invention to provide such a method in which nonrigid insulation material such as crepe paper may be used to provide insulation between the coil and its environment which insulation may be readily applied by relatively simple automated techniques and which insulation readily deforms to accommodate available space upon installation of the coil within its dynamoelectric machine housing. It is also an object of the present invention to provide such a method in which the inter-turn insulation is provided by a single layer of paper insulation and in which insulation between the exterior portions of the toroidal coil and its environment is provided by single layers of crepe paper. More particularly still, it is a specific object of the present invention to provide a method of applying the exterior insulation to a toroidal conductor coil which is simple to perform and results in a reliable end product. It is a particular object of the present invention to provide a method of insulating a coil structure which avoids the helical wrapping of insulator material around the toroid coil form.

SUMMARY OF THE PRESENT INVENTION

The present invention provides a method of forming a field coil, for example a stator field coil for a dynamoelectric machine, wherein a relatively infinite supply of linear dielectric material such as paper is arranged in side by side relationship with a relatively infinite length of linear conductor material to form a layered composite. The composite is thereafter formed into a coil having alternate layers of conductor and dielectric. When a suitably sized and shaped coil has been formed, the coil is then cut or otherwise severed from the relatively infinite lengths of dielectric and conductor. The inner end portion of the conductor of the coil is arranged to extend past the exterior turn of the coil. The coil is thereafter surrounded by a second dielectric material which may be for example crepe paper which is then bonded to itself around the exterior and interior peripheries of the coil. The presently preferred form of this exterior insulation is a pair of sheets of the second dielectric material in generally rectangular form and having dimensions which overlie the coil in each direction. Another form of the exterior insulation is in the shape of a bag or envelope into which the coil structure may be inserted.

Following the bonding of the exterior insulation, the central portion may be removed to form a window or aperture through which mounting structure may extend. The second dielectric material is arranged as by cutting to expose the end portions of the coil for communication to a source of electrical energy upon installation of the coil within a dynamoelectric machine. In order to accommodate lateral displacement of the adjacent turns of the coil to fit a curved housing of a dynamoelectric machine, the interior dielectric should be somewhat wider than the conductor so that adjacent turns when laterally displaced will still be in insulating contact with the interior dielectric.

BRIEF DESCRIPTION OF THE DRAWING

FIG. 1 of the drawing is a schematic view of the coil formation or winding mechanism including the mechanism for positioning the interior dielectric.

FIG. 2 is an enlarged sectional view taken along line 2—2 of FIG. 1.

FIG. 3 is an elevational view of the coil formed by the apparatus of FIG. 1.

FIG. 4 is a sectional view taken along the sectional lines 4—4 of FIG. 3.

FIG. 5 illustrates the coil structure of FIG. 3 inserted between a pair of sheets of exterior insulation in accordance with the method of the present invention.

FIG. 6 illustrates the insulated coil of FIG. 5 following the bonding of the sheets of exterior insulation to each other.

FIG. 7 is a sectional view taken along section lines 7—7 of FIG. 6.

FIG. 8 illustrates an alternate embodiment for applying the exterior insulation to the coil of FIG. 3.

FIG. 9 is a sectional view taken along section line 9—9 of FIG. 1 illustrating a portion of the coil formation process illustrated in that Figure.

DETAILED DESCRIPTION OF THE INVENTION

Referring now to the drawing wherein like numbers designate like structure throughout the various views thereof, FIG. 1 shows a schematic view of a coil formation process illustrating the first steps of the present invention. A relatively infinite reel of conductor material 10 and a relatively infinite reel of interior dielectric insulating material 12 are positioned on a pair of axles or spindles 14, 16 in parallel, spaced-apart relationship. Reel 10 is arranged to be unwound to continuously provide conductor element 18 to a plurality of feed rolls 20 which are arranged to propel conductor element 18 off of reel 10 and to straighten out the conductor material 18 to provide a relatively linear conductor element passing the rollers 20a, 20b. Conductor element 18, in relatively linear form, is then fed to a pair of roller members 22.

Reel 12 is arranged to be unwound over roller members 24 to provide a relatively continuous linear dielectric material 26 which is passed through roller member 28 and roll member 30 to feed drum 32 which is more fully described hereinbelow with reference to FIG. 9. Feed drum 32 is positioned slightly above and in parallel spaced-apart relationship with respect to the rolls 22 and is arranged in cooperation with roll 33 to propel and direct dielectric insulator 26 onto the surface of conductor element 18 which is passing over rolls 22.

Conductor element 18 and dielectric element 26 are then directed through further roller pairs 34 to coil winding mandrel 36 which winds the associated conductor and insulating dielectric into a suitable coil structure. When sufficient material has been wound to form the coil generally indicated as 38, cutting die 40 operates to sever the conductor member 18 and the insulator dielectric 26. For ease of handling, the coil element 38 so formed may be provided with a clip or other suitable means to maintain the conductor and the insulator element in interposed, wrapped relationship with respect to each other and coil member 38 may then be transferred to the next stage of its insulation process. In the meantime, cutting die 40 will open and the end 42 of the conductor 38 then positioned in the die will be fed to winding mandrel 36 for winding of the next coil element. As shown here, the cutting die 40 may be arranged to leave conductor end 42 free of overlay dielectric and angularly positioned so that the next coil 38 may be wound having both conductor ends in proximity and extending outwardly of the outermost turn of the coil as illustrated in, and described with respect to, FIG. 3.

Referring now to FIG. 2, the relationship between conductor member 18, dielectric 26 and rolls 34 is illustrated. Upper roll 34 is provided with a central channel which is sized and shaped to receive dielectric 26. Lower roll 34 is provided with a central channel which is sized and shaped to receive conductor 18. The rolls 34 are positioned with respect to each other to maintain the dielectric insulator 26 aligned in centered, aligned overlaying contact with the conductor 18.

With reference now to FIG. 3, the coil element 38 formed by the apparatus of FIG. 1 is illustrated in an elevational view. As can be seen, coil element 38 is comprised of the coiled conductor member 18 arranged in alternate layers or turns with one layer of dielectric insulator element 26. In addition, the innermost turn of the conductor element 18 includes outwardly extending tab member 42 which was provided by cutting and forming die 40 as described hereinabove. As illustrated, end tab 42 is arranged to be substantially parallel to and spaced-apart from the final turn end tab 44 and to be directed generally away from the interior of the coil element 38 in substantially the same direction. This is merely a matter of convenience and the final positioning of end tab 42 with respect to end tab 44 may be arranged to be in any relative relationship depending upon the use intended for coil element 38. In order to provide insulation between the various turns of coil 38 and end tab 42, the end tab 42 may be laterally spaced-apart from the turns of coil 38. Alternatively, a short length of dielectric material may be inserted between tab 42 and coil 38.

With reference now to FIG. 4, the coil structure 38 of FIG. 3 is illustrated in a cross-sectional view. This view clearly illustrates the alternate spacing arrangement of the dielectric insulator 26 and the metallic conductor material, for example copper, 18. As illustrated in FIG. 4, the coil 38 has been wound so that the dielectric insulator 26 is positioned interiorly of its associated turn of conductor 18. This is merely for convenience. As can be seen from this view, conductor 18 is solid and has a cross section which may be loosely termed rectangular. Thus defined, conductor 18 has a lateral dimension denoted by arrow *a*, which exceeds its perpendicular dimension denoted by arrow *b*, by several multiples. However, the present invention is not contemplated as being limited to use in conjunction with such conductor members and as used hereinbelow, the term "conductor member" will refer not only to conductor member 18 as illustrated but will also include other shapes for conductors, for example, solid circular cross section wire or stranded conductor wires. The dielectric insulator 26 has been cut so that the inner end 27 thereof extends circumferentially past the point where tab end 42 has been formed as shown by phantom lines and extends beyond the outer turn of coil 38. As illustrated herein, dielectric insulator 26 is provided with a lateral dimension (in the direction of arrow *a*) which exceeds the lateral dimension of conductor member 18. The importance of this dimensional difference will be discussed hereinbelow.

Upon completion of the coil winding process upon the mandrel 36 (FIG. 1), the coil element 38 thereformed may be provided with suitable means to maintain the integrity thereof while awaiting the next step in the process or may be directly carried to the next station in the assembly process wherein the coil 38 will be provided with the exterior or second insulating means. The exterior or second insulating means may be for example one or more sheets of insulating paper. The presently preferred paper is crepe paper as will be explained hereinbelow.

With reference now to FIG. 5, the fully insulated coil member 46 so formed is illustrated. This view shows the outline of coil member 38 in phantom lines including the tab ends 42 and 44. In forming the fully insulated coil member 46, a pair, for example, of sheets 47 may be provided which have the general outline of coil member 38 but with dimensions increased. The coil 38 may be placed between complimentary sheets in the case of two sheets, or between a folded single sheet of insulating material. The insulating sheets or sheet, as the case may be, may thereafter be bonded together about coil 38 by the application of heat and pressure or by glueing around the exterior periphery as at 48 and the interior periphery as at 50 of the coil member 38.

After the exterior insulation 47 has been bonded together as at 48 and 50 to provide a fully insulated coil member, extraneous portions of this insulating material may be removed by cutting or tearing. As shown in FIG. 6, the outer periphery portion 48 of exterior insulation may be removed in the vicinity of the tab members 42, 44 so that these members may be ultimately connectable to a source of electrical energy. Additionally, the interior periphery may be trimmed for example along dashed line 51 of FIG. 5 to provide a hole or window 52 which will facilitate mounting of the fully insulated coil 46 in, for example, a dynamo-electric machine, wherein the pole piece is coupled to a housing by bolting or other suitable means passing through the window 52.

With reference to FIG. 7, which is a sectional view of FIG. 6 taken along section lines 7—7, the fully insulated coil element 46 is illustrated. As can be seen in FIGS. 6 and 7, the exterior and interior peripheries 48, 50 of what has now become a generally toroidally shaped, fully insulated, coil 46 are represented by a pair of relatively short tabs with the exterior insulation 47 completely surrounding and encapsulating the coil element (except for portions of the end tabs 42, 44) comprised of alternate turns of dielectric 26 in conductor 18. While the material selected to comprise the exterior insulation 47 may be relatively flexible to permit insertion into a housing which requires lateral displacement of adjacent turns of the conductor 18 while maintaining the integrity of the exterior insulation 47, it can be seen that the presence of dielectric 26 having a substantially greater lateral dimension than the lateral dimension of conductor 18 prevents adjacent turns of conductor 18 coming into contact which would cause shorting out of the turns and a reduction in the electromagnetic field produced by the fully insulated coil 46. Furthermore, the exterior insulation 47 represents a relatively small bulk to be absorbed in any housing/pole structure assembly which receives fully insulated coil 46. The interior, or first, dielectric material 26 should be more rigid than the second or exterior dielectric material and should preferably be provided with relatively smooth surfaces for contact with the conductor. This smooth surface will facilitate sliding of the first dielectric with respect to the conductor both during the coil forming step and the lateral displacement expected upon installation within a dynamoelectric machine.

With reference now to FIG. 8, an alternate step for encapsulating coil 38 within insulation is illustrated. In this embodiment, the sheet or sheets of insulation 47 have been replaced with a bag or envelope 56 of suitable insulation material. In accomplishing this step of encapsulation the coil 38 is merely inserted within the bag or envelope 56 and generally centrally located therewithin and the bag or envelope 56 is thereafter sealed. One form of bag or envelope 56 would provide for dimensions which closely match the end dimensions of coil 38 so that merely sealing the open end of bag or envelope 56 would adequately position coil member 38 therewithin. Thereafter, the central portion of bag or envelope 56 could be sealed to itself in much the same fashion as the insulator material 47 was sealed to itself at the area of the interior periphery with regard to FIG. 5.

With reference now to FIG. 9, roll 32 of FIG. 1 is illustrated as having a general cross section which includes an annular vacuum manifold 58 connected to a suitable source of vacuum, not shown. This vacuum is applied from manifold 58 to peripheral groove 60 through a plurality of pairs of openings, one of the pair being identified by numeral 62, the other of the pair being identified by numeral 64. Thus, the thin dielectric material 26 may be held within groove 60 by means of vacuum in manifold 58 and roll 32 may therefore be used as the motive force in unwinding dielectric material 26 and propelling it along the upper surface of conductor element 18 which in turn is being propelled by rollers 20. Roll 33, of FIG. 1, assists in separating dielectric 26 from roll 32.

It can thus be seen that the instant invention readily accomplishes its stated objective. A method is provided for completely insulating an electric coil while providing that coil with sufficient freedom to be deformed in order to be received within a desired housing structure while nevertheless providing that only a requisite minimum insulation material is present throughout the coil structure. In those instances where excess insulation material is produced by the practice of the method of this invention, the excess material is relatively innocuous when compared with the quantities of extraneous insulation material necessitated by the prior art method.

What we claim is:

1. A method of forming an insulated electrical coil formed of a number of turns of a conductive member, the conductive member having a width dimension generally perpendicular to the plane of the coil and a thickness dimension generally in the plane of the coil, comprising the steps of:

- associating a single layer of insulating paper with a single layer of the conductive member in such a manner that the paper covers a surface of the conductive member having a width dimension to form paper-covered conductive member;
- coiling a finite length of said paper-covered conductive member into a coil form in which said paper layer is interposed between adjacent layers of the conductive member;
- pre-cutting a pair of insulating paper sheets to provide sheets having dimensions which overlie the coil in each direction; and
- inserting the coil form between the sheets and uniting the sheets about the coil form to provide toroidal encapsulation.

2. The method of claim 1 wherein the step of pre-cutting occurs prior to the step of coiling.

3. The method of claim 1 wherein the step of pre-cutting occurs after the step of coiling.

4. The method of claim 1 wherein the step of precutting includes the cutting of a generally centrally positioned hole within said sheets.

5. The method of claim 1 including the step of cutting the united sheets of insulating paper centrally of the coil form to form a centrally positioned aperture whose axis extends generally perpendicular to the plane of the coil.

6. The method of claim 1 including the step of cutting the united sheets of insulating paper to expose the ends of the conductive member of said coil form.

7. The method of claim 6 wherein said envelope is formed of insulating paper including a pressure sensitive adhesive on its interior surface and the step of sealing comprises the step of applying pressure to said envelope in a direction generally perpendicular to the plane of the coil at a level and for a time sufficient to cause the adhesive to set.

* * * * *